United States Patent
Hugi

(10) Patent No.: US 11,287,319 B2
(45) Date of Patent: Mar. 29, 2022

(54) (MULTI-) HETERODYNE DETECTION SPECTROMETER SETUP

(71) Applicant: IRsweep AG, Stäfa (CH)

(72) Inventor: Andreas Hugi, Zürich (CH)

(73) Assignee: IRsweep AG, Stäfa (CH)

( * ) Notice: Subject to any disclaimer, the term of this patent is extended or adjusted under 35 U.S.C. 154(b) by 65 days.

(21) Appl. No.: 16/622,906

(22) PCT Filed: Jun. 15, 2018

(86) PCT No.: PCT/EP2018/065961
§ 371 (c)(1),
(2) Date: Dec. 13, 2019

(87) PCT Pub. No.: WO2018/229258
PCT Pub. Date: Dec. 20, 2018

(65) Prior Publication Data
US 2021/0131868 A1    May 6, 2021

(30) Foreign Application Priority Data

Jun. 15, 2017 (CH) .................................. 00775/17
Jul. 28, 2017 (CH) .................................. 00983/17

(51) Int. Cl.
*G01J 3/10* (2006.01)
*G01B 9/02003* (2022.01)
(Continued)

(52) U.S. Cl.
CPC ............ *G01J 3/10* (2013.01); *G01B 9/02003* (2013.01); *G01J 3/4338* (2013.01); *G01B 9/02007* (2013.01)

(58) Field of Classification Search
CPC ...... G01J 3/10; G01J 3/4338; G01B 9/02007; G01B 9/02003
See application file for complete search history.

(56) References Cited

U.S. PATENT DOCUMENTS

2010/0029026 A1    2/2010 Berger et al.
2010/0046003 A1*   2/2010 Le Floch ........... G01B 9/02007
                                                  356/486

FOREIGN PATENT DOCUMENTS

WO    9602837 A1    2/1996
WO    2014098925 A1    6/2014
WO    2017044604 A1    3/2017

OTHER PUBLICATIONS

Borja Jerez, "Dual optical frequency comb architecture with capabilities from visible to mid-infrared" 2016 (Year: 2016).*

(Continued)

*Primary Examiner* — Maurice C Smith
(74) *Attorney, Agent, or Firm* — Paul D. Bianco; Gary S. Winer; Fleit Intellectual Property Law

(57) ABSTRACT

A heterodyne detection spectrometer setup comprises an optical path with at least a first cavity able to emit a first laser beam; a second cavity able to emit a second laser beam; and at least one combining and/or reflecting element. The cavities are connected to current drivers for stimulating laser emission, which shows increased signal-to-noise ratios of the heterodyne signal and an increased dynamic range. This can be reached if at least the second cavity comprises an active medium connected to a heterodyne signal extraction element and a (multi-) heterodyne signal processing unit, which is simultaneously usable for laser light generation and as detector element, comprising an active medium introduced in the optical path in order that the first and/or second laser beam can enter the respective other cavity. At least one reference path is established between the two cavities in the optical path with at least two combining and/or reflecting elements.

25 Claims, 10 Drawing Sheets

(51) Int. Cl.
    *G01J 3/433*     (2006.01)
    *G01B 9/02001*     (2022.01)

(56) References Cited

OTHER PUBLICATIONS

L Gu, "High frequency modulation and injection locking of terahertz quantum cascade lasers" May 25, 2017 (Year: 2017).*
International Search Report dated Sep. 6, 2018 for PCT/EP2018/065961 filled Jun. 15, 2018.
Written Opinion for PCT/EP2018/065961 filled Jun. 15, 2018.
International Preliminary Report on Patentability dated Dec. 17, 2019, with Written Opinion for PCT/EP2018/065961 filed Jun. 15, 2018 (English translation).

* cited by examiner

(MULTI-) HETERODYNE DETECTION SPECTROMETER SETUP

TECHNICAL FIELD

The present invention describes a heterodyne detection spectrometer setup, comprising an optical path with at least a first cavity, able to emit a first laser beam, a second cavity, able to emit a second laser beam, at least one combining and/or reflecting mean, where the at least two cavities are connected to current drivers for stimulating laser emission.

STATE OF THE ART

Optical sensing solutions in the mid-infrared range, are commercially interesting in different applications, for example to perform absorption spectroscopy, because the mid-infrared range is the fingerprint region of most molecules. There is a strong demand of optical detecting methods, such optical (multi-) heterodyne detection setups, offering broad spectral coverage and speed in combination with high brightness.

Today a known heterodyne respectively a multi-heterodyne detection setup comprises at least two cavities consisting of an electrically-pumped frequency comb integrated into a single few millimeter long laser diode emitting many well-controlled wavelengths at the same time.

Each individual emission frequency ($f_n$) of a frequency comb source can be described mathematically by the formula: $f_n = f_{ceo} + n*f_{rep}$, where $f_{ceo}$ is the carrier envelope offset frequency and $f_{rep}$ is the repetition frequency (mode spacing).

A simplified embodiment of a dual-comb and multi-heterodyne detection scheme according to the prior art is depicted in FIG. 1.

The optical heterodyne detection setup comprises a first cavity 1 and a second cavity 2, which are both connected to not depicted current drivers, which are operating the emission of laser beams. The first cavity 1 emits a first laser beam f1 and the second cavity 2 emits a second laser beam f2. In this setup the first laser beam f1 is passing through a sample 4 before entering a combining and deflecting means 3 and a detector 5. The second laser beam f2 is deflected through the combining and/or deflecting means 3 into the detector 5, without passing the sample 4. Both laser beams f1, f2 are superimposed on the detector 5 and a beating signal at the difference frequency of the emission frequencies f1, f2 of the cavity-lasers 1, 2 is generated on the detector 5. In another embodiment the sample 4 can be placed after the combining and deflecting means 3 in the optical path, so that both laser beams f1, f2 are combined and passed through the sample 4. All components are placed in the optical path. Connected to the detector 5 is a heterodyne signal processing unit 6, which subsequently analyzes said signal to generate a meaningful analysis of the heterodyne signal for the user. The optical signals are down-converted in the multi-heterodyne setup to the RF-domain and therefore need to be processed in the heterodyne signal processing unit 6.

It is clear, that high demands are made on the cavities 1, 2 and the detector 5, being locally spaced apart from each other. The skilled person knows usable emitting cavities 1, 2, comprising a cavity with active medium, for example semiconductor laser. Also passively driven detectors 5 are known, which have to be adapted to the estimated laser frequencies.

As known a heterodyne signal in the RF-domain on the detector 5 is generated by generating mixing terms of the two cavities 1, 2 when measuring the intensity on the detector 5. Heterodyne detection is very common in many domains and has been extensively used in dual-comb setups.

The heterodyne signal is characterized as follows:

$$I \propto (E_1 \cos(\omega_1 t + \phi) + E_2 \cos(\omega_2 t))^2$$

$$\propto \tfrac{1}{2}E_1^2 + \tfrac{1}{2}E_2^2 + 2E_1 E_2 \cos(\omega_1 t + \phi)\cos(\omega_2 t)$$

The two first terms correspond to the DC signal, whereas the last term represents the mixing term of the two laser frequencies f1, f2. Sum as well as the difference frequencies are generated. The optical frequencies f1, f2 are set in a way, that the difference frequency lies within the RF-bandwidth of the detector 5. The heterodyne signal measured on the detector 5 is thus the difference frequency of the mixing term. In a multi-heterodyne detection, the single frequency is replaced by many frequencies.

In a dual-comb setup, the cavity-lasers 1 and laser 2 are usually two frequency-comb sources with a plurality of equally spaced modes. It is however also possible to use lasers with a low coherence between the modes, so called Fabry-Pérot devices.

The development of optical frequency combs in the mid-IR and THz spectral regions is especially interesting since most light molecules have their fundamental roto- and vibrational absorption bands in this wavelength range. The absorption strength of most molecules is orders of magnitudes stronger compared with the overtone bands in the near-IR region, allowing a highly sensitive time-domain frequency-comb spectrometer.

Multi-heterodyne detection technique in a dual-comb setup has many advantages. It allows for a broadband parallel acquisition of the entire laser spectrum, resulting in time-resolved spectra in very short time scale and massive parallel datasets. Another big advantage of a multi-heterodyne detection technique is the gain in detection which can be achieved with such a setup. Often, one of the two laser intensities is weaker compared to the other. Therefore, systems can be designed in which the energy resulting from the mixing $2E_1 E_2$ can be bigger than the original intensity of a single laser $E1^2$. This is for example the case if the laser amplitude E1 is strongly absorbed by the sample which is measured, e.g. liquids or saturated gases or reflection measurements. Another example where heterodyne detection is used efficiently is in stand-off detection schemes. The laser passing through the sample travels long distances in the atmosphere and is possibly reflected very weakly at a target or a mirror, resulting in very weak back-reflection scattered light.

Prior art setups mostly use low-temperature mid-infrared detectors 5, resulting in more complicated, expensive and complex setups. Even with cooled detectors 5, the resulting signal-to-noise ratios of the heterodyne signal and the dynamic ranges of the prior art could so far not become as high as desired by the end-user.

DESCRIPTION OF THE INVENTION

The object of the present invention is to create a (multi-) heterodyne detection spectrometer setup and a (multi-) heterodyne detection method, with increased signal-to-noise ratios of the heterodyne signal, increased dynamic range as well as improving the reachable bandwidth compared to prior art setups.

The problems are solved with a (multi-) heterodyne detection spectrometer setup according to claim 1 and by using a (multi-) heterodyne detection method with such a setup.

To solve the problem, the conventional detector used in (multi-) heterodyne detection techniques, such as in a dual-comb setup, is replaced using an intracavity detection step in at least one cavity, comprising an active medium, while this at least one cavity also stimulates and/or emits simultaneously a laser beam while detection is carried out.

BRIEF DESCRIPTION OF THE DRAWINGS

Preferred exemplary embodiments of the subject matter of the invention respectively implementations of setups are described below in conjunction with the attached drawings.

FIG. 2a shows a schematic view of a (multi-) heterodyne detection spectrometer setup according to the invention, comprising at least two active laser cavities, where the detection is enhanced by at least one active cavity detection, while FIG. 2b shows a schematic view of a setup with an optical isolator in the optical path, while

FIG. 3a shows a schematic view of a possible setup to avoid injection locking, wherein a third laser operating in a multi-mode regime (fabry-pérot or frequency comb) was added, while FIG. 3b shows a diagram illustrating the problem of injection locking of one laser to another, therefore the heterodyne signal needs to be kept at a high frequency to avoid injection locking, while

DESCRIPTION

Optical (multi-)heterodyne detection setups are presented in different implementations, comprising an optical path with at least a first cavity a, emitting a first laser beam e, at least a second cavity b, emitting a second laser beam f, at least one combining and/or reflecting mean g and a sample d penetrated by the radiation of the laser beams. Both cavities a, b are connected to and operated with current drivers q, in order to produce laser beams e, f. The combining and/or reflecting mean g can be achieved by fibers, free path optics, waveguides or guided optics, as known in optical setup. A combining and/or reflecting mean g in the optical path could in particular be an optical fiber or a later described reference path could in particular be an optical fiber.

According to the present invention at least one of the cavities is operated as active cavity element, used as laser light source and detector element simultaneously. The active cavity element comprises an active medium in which a laser beam is stimulated and reflected in the cavity, as to reach laser emission, operated by current driver q.

With a heterodyne signal extraction element k and a (multi-) heterodyne signal processing unit h, signals are additionally coupled out of the at least one active cavity. As in (multi-)heterodyne detection setups possible, conventional RF electronics can be used for extraction and processing electronics. The heterodyne signal is measured as described in the state of the art.

The heterodyne gain is increased considerably due to the larger electromagnetic field inside an active cavity used as light source and detector element simultaneously. Such high electromagnetic fields cannot be reached in separated locally spaced detectors. In the active cavities respectively in the active medium in the cavities, light waves are mixed as indicated with a wiggly line in the figures. The active cavity element acts as a laser light emitter and enhanced measurement element, while we waived a locally separated detector. The stimulated laser of the active cavity is merged with at least one other laser light, stimulated in at least one separated cavity.

Use of such active cavity elements generally results in better signal-to-noise ratios of the heterodyne signal an thus larger dynamic range compared to state-of-the art systems. Another advantage of the active cavity enhanced heterodyne detection is the available bandwidth. The ultimate RF-bandwidth of the detection unit is limited by the relaxation lifetime of the active region making detection units >1 GHz realizable.

Figure 1:
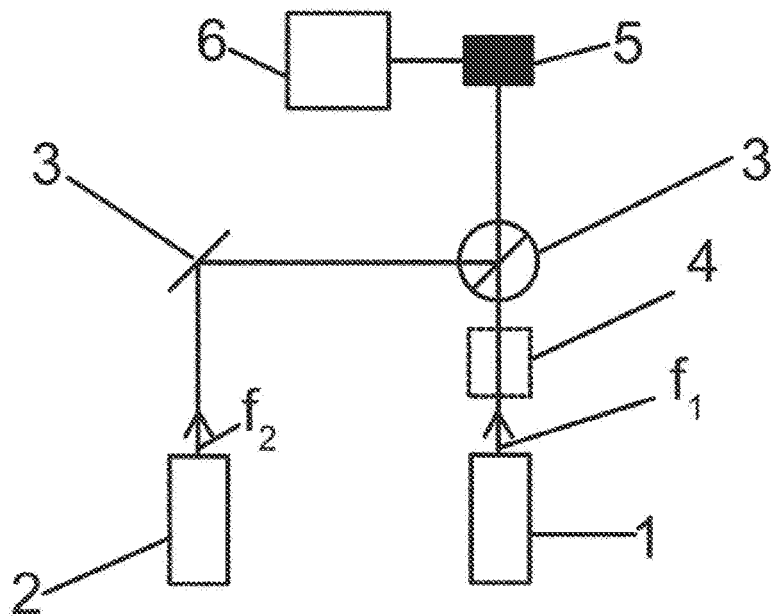
FIG. 1 shows a schematic view of an optical multi-heterodyne detection setup according to prior art with a conventional detector.
Figure 2A:
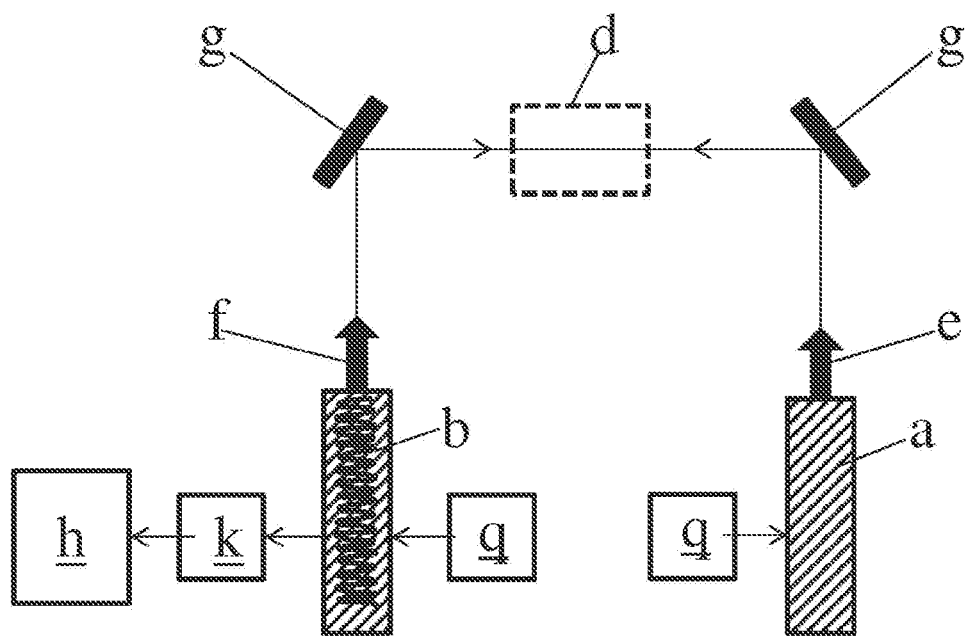

The laser light of the first cavity a/first laser a is injected into the second cavity b or active cavity element b, as illustrated in FIG. 2a. Both cavities a, b can be semiconductor laser, in particular the active cavity element b is a quantum cascade laser b (QCL). Also possible is use of interband cascade laser (ICL). It can be operated either in single mode or as a fabry-pérot laser or as a frequency comb laser. While turned on a high intensity electro-magnetic light field is present in the active cavity b and first cavity a.

The heterodyne mixing of the injected laser happens in the active medium of the second cavity b/active cavity b. The generated heterodyne signal is then extracted through the extracting element k from the second cavity b and processed by the (multi-) heterodyne signal processing unit h.

One possible way to extract the heterodyne signal from the second cavity b is through a bias-tee. Another one would be a directional coupler. Another consists of a simple splitter. Yet another one is done through a filter element (analog or digital) which filters the pass-band in which the heterodyne signal resides.

Using an active cavity element b as a heterodyne detector is possible if two conditions are fulfilled.

First, the detection is based on a second order non-linear mixing term $X^2(v)$. If this term in the active medium is large, the mixing gain is large. In a quantum cascade laser b, this term is especially large due to the quantum well structure and the associated large non-linear coefficients.

Second, the gain-bandwith of the active element b needs to be large enough in order for the carriers inside the active element to follow the heterodyne signal. This is also given in a QCL due to its very short upper state sub ps lifetimes, resulting in enormous bandwidths of up to several THz. Therefore, a semiconductor laser with large non-linear coefficient and a fast gain medium can be operated as ideal heterodyne detector. This is especially true for QCL (quantum cascade laser) as well as ICLs (interband cascade lasers).

Using at least one active cavity b as enhanced detector has several key technological advantages compared to state-of-the-art dual-comb systems which rely on regular detection units.

First of all, it is possible to get rid of the classical detector element 5 entirely, reducing largely the complexity of the setup. Second, the detection is happening inside the active cavity b. The electro-magnetic field intensities inside the active cavity b is much larger compared to the field intensity outside of the cavity. Therefore, the gain experienced in heterodyne detection setups described earlier is much stronger compared to the state-of-the art implementation. Therefore, this invention enhances strongly the measured signal strength and systems designed with this reach superior signal-to-noise ratios (SNR). Another advantage compared to the state-of-the art implementation, especially in the mid-infrared range, is the omission of detection elements 5 that need to be operated at low temperature using a thermoelectric Peltier element. Detectors 5 used in mid-infrared dual-comb systems according to prior art are usually operated at low temperatures (<−30° C.) to reduce the thermal dark current. Three-stage Peltier elements are very commonly used to achieve low temperatures to enhance the performance of the detector. This strongly limits and hinders the adoption of the dual-comb spectroscopy approach in small sensor units.

In the presented invention, it is not necessary to cool the detecting laser to low temperature if the laser operates at room-temperature. Today's semiconductor lasers, including quantum cascade lasers, usually operate at room-temperature. Therefore, the realization of extremely compact all semiconductor based sensors become possible.

Since the setup can be designed to use the same active cavity element b for the detector and the laser source, which interrogates the sample, the optical bandwidth of the detection is perfectly matched to the light it needs to detect. This reduces strongly the dark current of this detection setup.

Figure 2B:
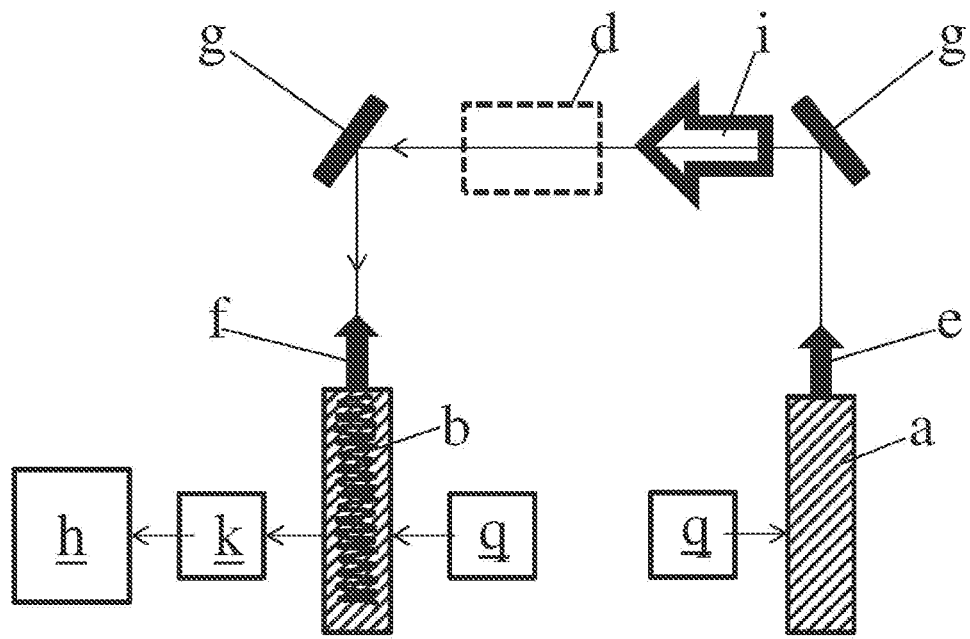

FIG. 2b further shows an improved version of the invented setup. The system is enhanced by adding an optical isolator element i. The addition of an isolator i has several advantages. First of all, the injection of laser beam f of cavity b into cavity a is prohibited. Furthermore, it has the effect to reduce strongly standing wave-patterns between cavity a and active cavity b.

Possible optical isolator elements i consist of faraday rotators with polarizers. Another possible implementation is a quarter wave plate i, an attenuating element i or a partial HR coating on the cavity facet. The attenuating element i might be a neutral density filter i, a polarizer i or it might be implemented on the facet of the laser through a reflection coating i. The reflection coating can be implemented through a dielectric or dielectric and metallic coating.

In order to achieve maximum detectivity the polarization emission of the second cavity b in FIG. 2b should be adjusted to the exit polarization of the isolator element i. This can be achieved by rotating the second cavity b until the signal strength is maximum.

Figure 2C:
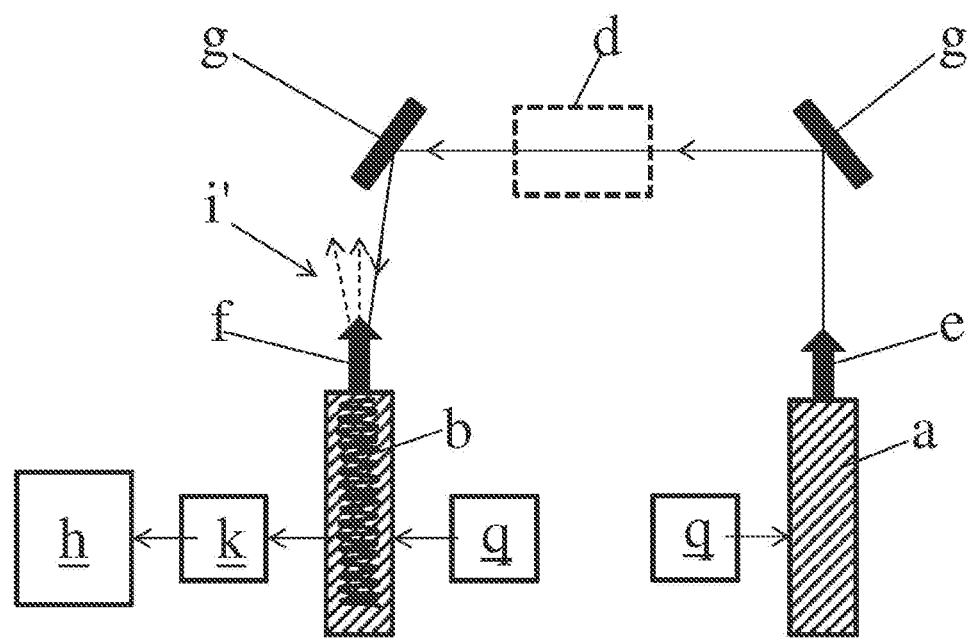
FIG. 2c shows a schematic view of a setup, wherein an optical isolator is reached through non-normal injection of laser light of the first cavity in the second cavity. The reflected beam of the first cavity will therefore not fed back into the first cavity.

Another possible implementation shown in FIG. 2c of an isolator is ensuring that laser radiation of the first cavity a respectively sample laser a does not enter perpendicular to facet of the active cavity b respectively enhanced laser detector element b. This ensures that no reflected emission from first laser a on the facet of second laser b and no direct emission from active cavity cell b enters the first laser a. All the presented isolators can be combined to enhance the isolation effect.

Furthermore in this configuration, the skilled engineer can use different focal length lenses and mirror shapes and apertures to reduce collection efficiency and injection powers of the respective lasers.

Figure 3A:
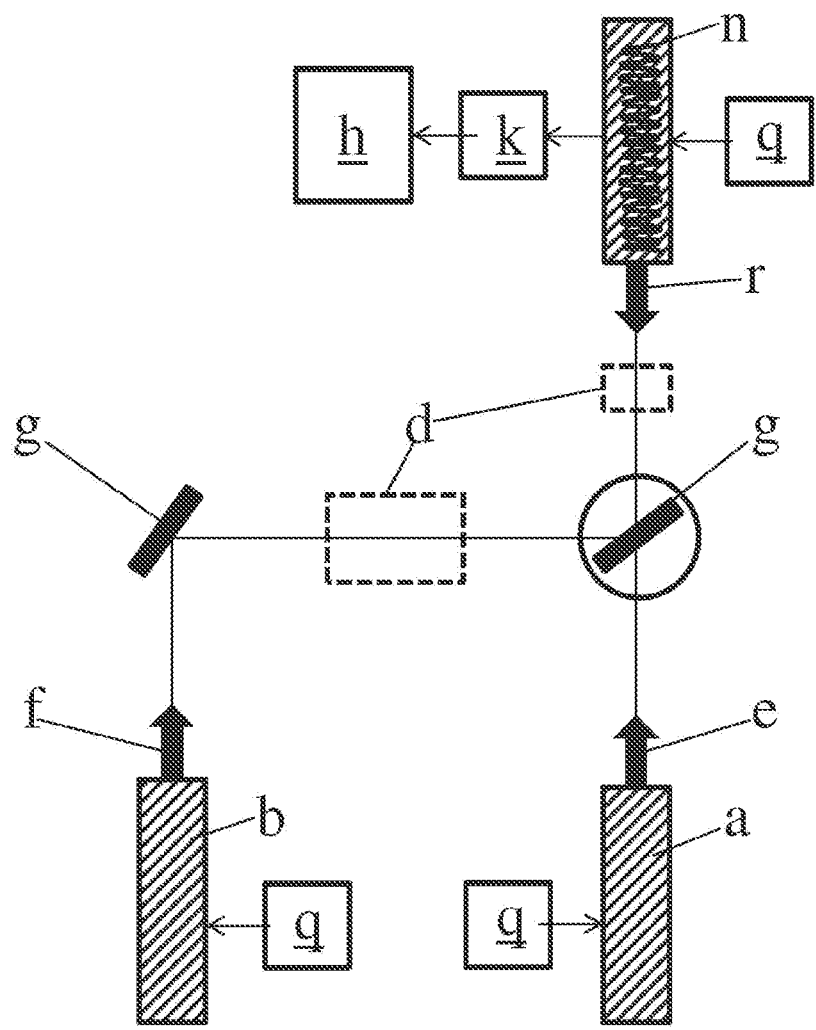

FIG. 3a shows a preferred embodiment of an invented setup. The embodiment has a first cavity a and a second cavity b as well as a third cavity n. In this embodiment, the third cavity n respectively third laser n acts as the active cavity enhanced measurement element n, while emitting a third laser beam r. The third laser n is operated with current driver q, while heterodyne signals can be coupled out by heterodyne signal extraction element k and (multi-)heterodyne signal processing unit h. While the third active cavity n is another semiconductor laser, specifically another quantum cascade laser. The cavities a, b, n are placed in such a way, that mixing of at least one laser beam e, f in the third cavity n, with the third laser beam r is enabled in the active medium of the third cavity n.

However, in this embodiment, it is important to note that the third laser does not necessarily need to be running, so does not necessarily emit the third laser beam r. Either the third laser n is driven below the threshold ($0 \leq I_n \leq I_{th\_n}$) current, above the threshold current ($I_{th\_n} < I_n$), or in reverse bias ($0 > I_n$).

The gain in the active cavity n is provided by the laser gain in every of these cases. Preferably though, the laser is running again in a multi-mode operation (fabry-pérot or frequency comb).

Injecting laser a as well as second laser b into the detecting laser element n means that we can generate two multi-heterodyne signals in the active laser cavity n. One originating from mixing laser a and third laser n. The other one originating form laser b and third laser n. These two multi-heterodyne signals can be set at a high frequency to avoid frequency locking of any of the lasers a, b, n. These two multi-heterodyne signals in the RF-domain (radio frequency domain) can then again mix with each other and down-convert to the beforehand forbidden frequency bands.

The mixing of laser a and laser b in the cavity laser n can become problematic, but several solutions are presented here to overcome the problem.

First of all, the injecting powers of laser a and b are much smaller compared to the intensity of laser n. Therefore the mixing term of laser a with laser b is much smaller than mixing terms of first laser a and third laser n and second laser b and third laser n. This effect can even be enhanced by putting a partially reflective HR (high reflection) coating on the front facet of the third active laser n, enhancing further the field of the third laser n and decreasing the fields of first and second lasers a, b.

Another possible way to avoid problems is choosing the fceo and frep of first and second laser a, b in a fashion such that the mixing terms of first and second lasers a, b occupy different and non-problematic frequency bands for interference than the mixing of first laser a and third laser n as well as second laser b and third laser n.

Figure 3B:
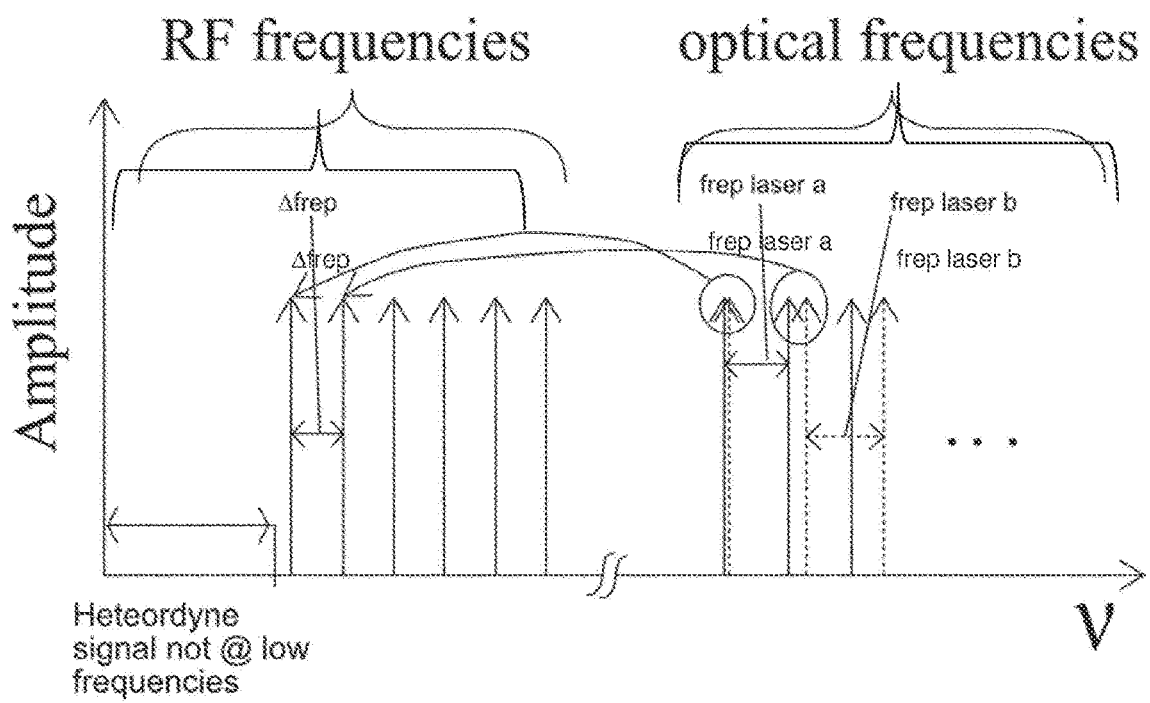

Also less processing is required because of the lower required sampling rate. Therefore, the requirement to keep the multi-heterodyne signal at high RF-frequencies is not desirable and strongly hinders the adaption of the presented invention. The origin of this problematic is illustrated in FIG. 3b. Bringing the heterodyne signal to low frequency values effectively means that the emission frequency of the two lasers a, b approach each other. Injecting a laser into another laser can lead to a so called injection-locking phenomenon. The laser which is injected into another laser seeds the emission frequency and the injection locked laser follows this laser. This needs to be avoided.

In a single heterodyne case, the heterodyne signal would collapse and add itself to the DC signal on the detector. It is also problematic in a multi-heterodyne case. For optical multi-heterodyne detection to work, it is necessary that the two lasers a, b have a different repetition frequency to generate a multi-heterodyne signal spaced by $\Delta\text{frep}=\text{frep}_{lasera}-\text{frep}_{laserb}$.

The repetition rate of each laser is given by the mode-spacing of the lasers. If one laser is injection locked to the other, Δfrep effectively becomes zero and the multi-heterodyne signal collapses to a single heterodyne line, again at DC frequency. It is therefore not possible anymore to map the optical frequencies to the corresponding RF-frequencies. As a consequence, to avoid injection locking one laser to the other, the heterodyne signal is required to stay at large RF-frequencies.

Figure 3C:
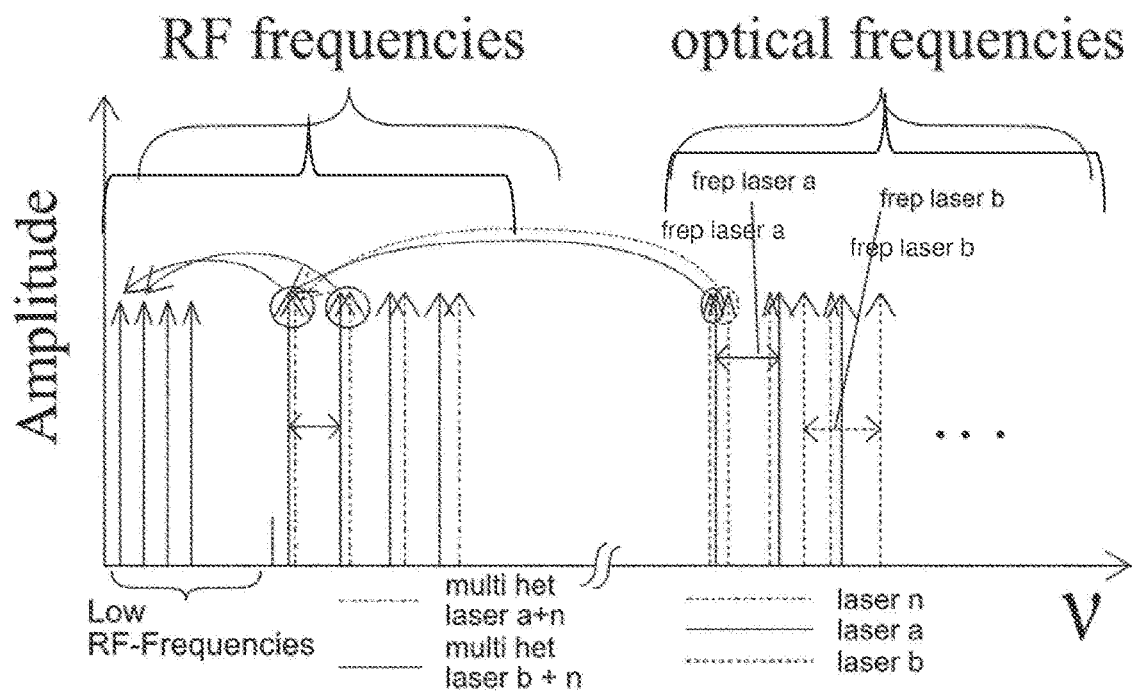
FIG. 3c shows a diagram illustrating the possibilities of the here shown active cavity enhanced detection system to avoid injection locking of one laser to another.

FIG. 3c shows an illustration of the invention which overcomes the limitations described above. The detector of a conventional heterodyne detection system is replaced with an active cavity enhanced detection, while in at least one active cavity, operated simultaneously as laser source and detection element. The heterodyne mixing of an injected laser happens in the active medium of the active cavity n.

Inside the cavity n of the third laser n, first cavity/laser a as well as the second cavity/laser b generate a (multi-) heterodyne signal. These two multi-heterodyne signals in the RF-domain (a+n/b+n) will then mix down to the (muti-) heterodyne signal at lower frequencies beforehand non-atteinable due to injection locking limitations.

Figure 4A:
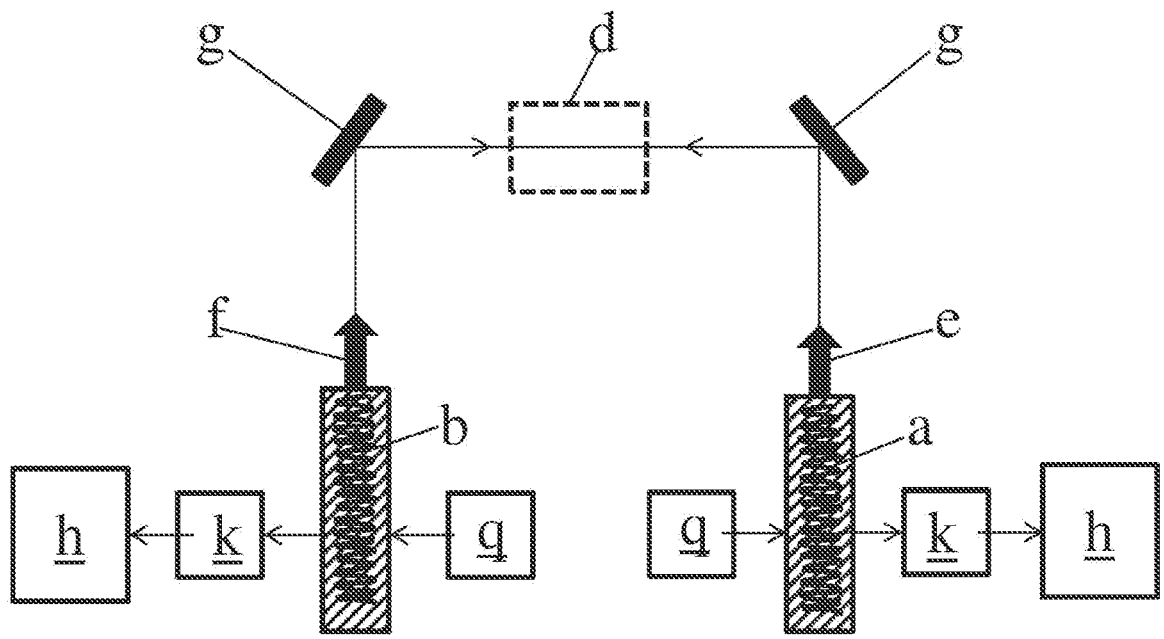
FIG. 4a shows a schematic view of another embodiment of a possible (multi-) heterodyne detection spectrometer setup, wherein both cavities are used as sampling laser and detecting element. The heterodyne extraction element is used on both lasers and better signal to noise ratios can be achieved.

Another possible implementation use heterodyne signal extraction k and (multi-)heterodyne signal processing unit h on both first and second laser a, b. This is illustrated in FIG. 4a. In this implementation, both lasers a, b acting as the sampling laser as well as the detecting element. This implementation has the advantage that more information is gained and a better SNR (signal to noise ratio) can be achieved. It is important to note, that in all preferred embodiments illustrated here, it is always possible to add or remove heterodyne extracting elements k and (multi-)heterodyne signal processing units h to all involved lasers a, b, n respectively detecting elements. This gives the user the flexibility to improve the SNR by adding reference channels and additional measurement channels.

Figure 4B:
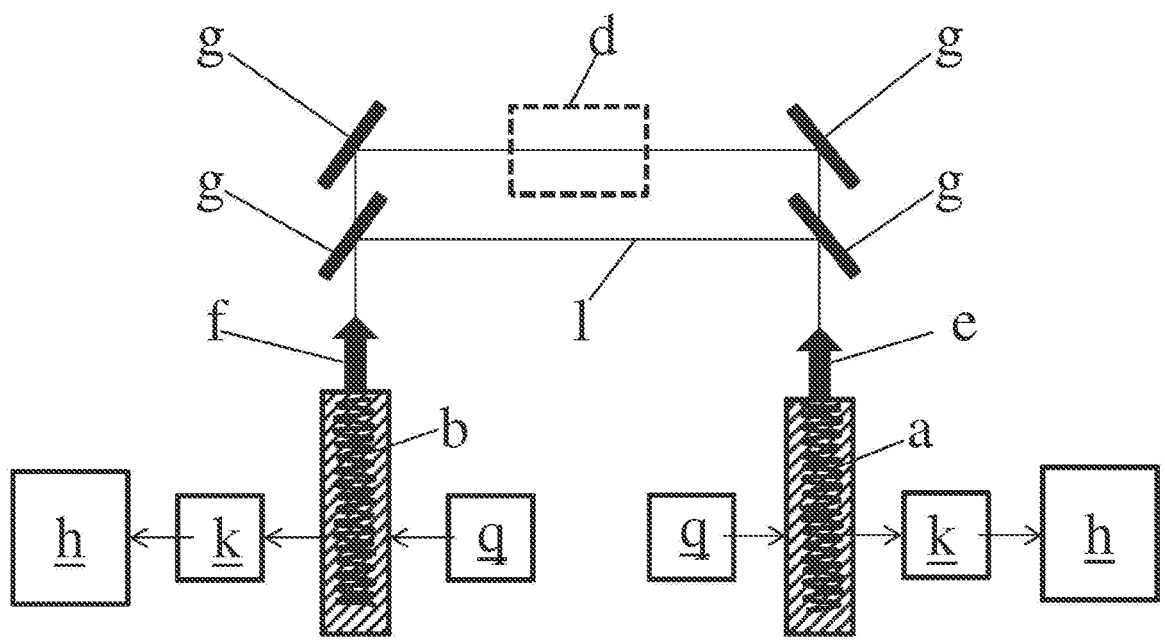
FIG. 4b shows a schematic view of the setup according to FIG. 4a with a reference path added.

FIG. 4b shows another improved version of the invention. The system is enhanced by adding a reference path l to the optical path. The light which passes the reference path l emitted from laser b does not pass the sample d to measure. It is therefore possible to extract a heterodyne signal from first laser a through a heterodyne extractor k and analyze with a heterodyne detection unit h. Compared to the implementation of FIG. 4a the heterodyne signal on laser a can be used as a reference signal since it has not been altered by the sample d. Signal amplitude variations generated by laser noise for example can therefore be rationed out and a better SNR can be achieved. For the embodiment using a separate reference channel as shown in FIG. 4b, again also adding isolator elements can enhance the system stability.

Using two isolator elements i, i' in a counterpropagating fashion ensures that the two channels are independent from each other. The light which exits laser a will only travel through the sample d since it is blocked by the isolator i' in the reference path l. In contrast, the laser light from laser b will be blocked by the isolator i in the sample path and will only pass through the reference path l. Two preferred embodiments are shown in 4c and 4b.

Figure 4C:
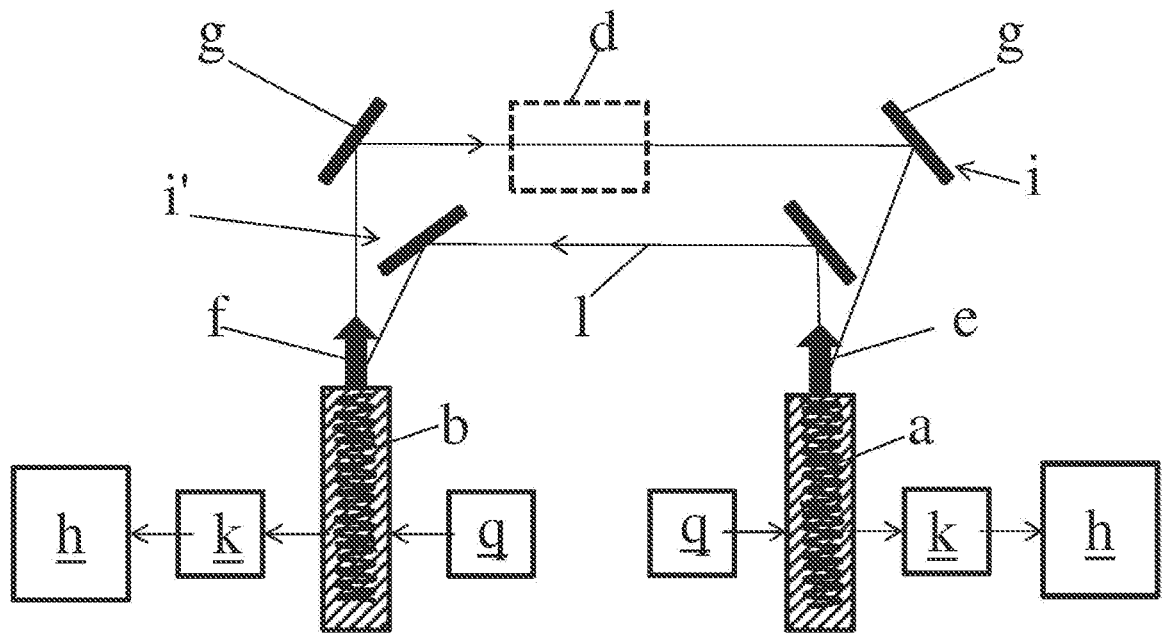
FIG. 4c shows a schematic view of an adapted (multi-) heterodyne detection spectrometer setup with reference path and additional isolating elements. The isolating elements are implemented by non-normal incident radiation of both cavities on the opposing laser facet.

Making sure that no radiation from either laser a nor laser b enters perpendicular to the laser facet of the other laser b, a as shown in FIG. 4c, reflections from either facet will not be fed back into the originating laser cavity, while both cavities a, b are emitting and detecting simultaneously. Furthermore, only one laser passes by the sample, the other one by the reference path.

Figure 4D:
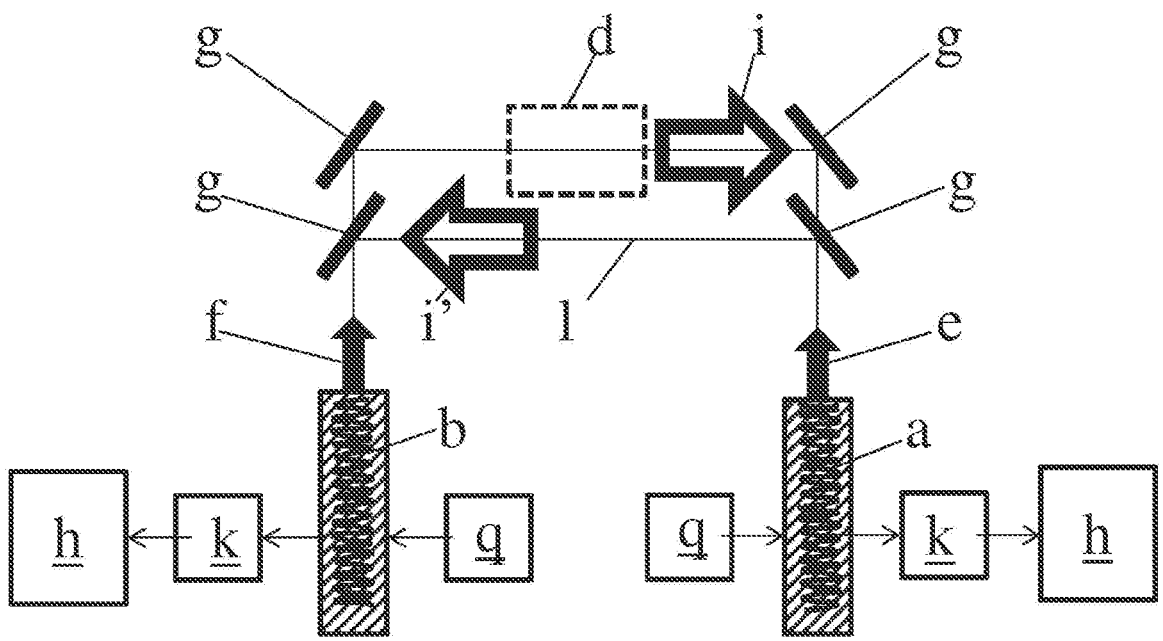
FIG. 4d shows another adapted setup in a schematic view, wherein different isolating elements are added in the optical path and the reference path to achieve better system stability.

Another preferred embodiment is shown in FIG. 4d achieving the same goal. Again, the isolating elements i, i' can be implemented through faraday rotators with polarizers, quarter wave plates or an attenuating element. It is again possible to implement the isolators similar to the case shown in FIG. 2c.

Figure 5A:
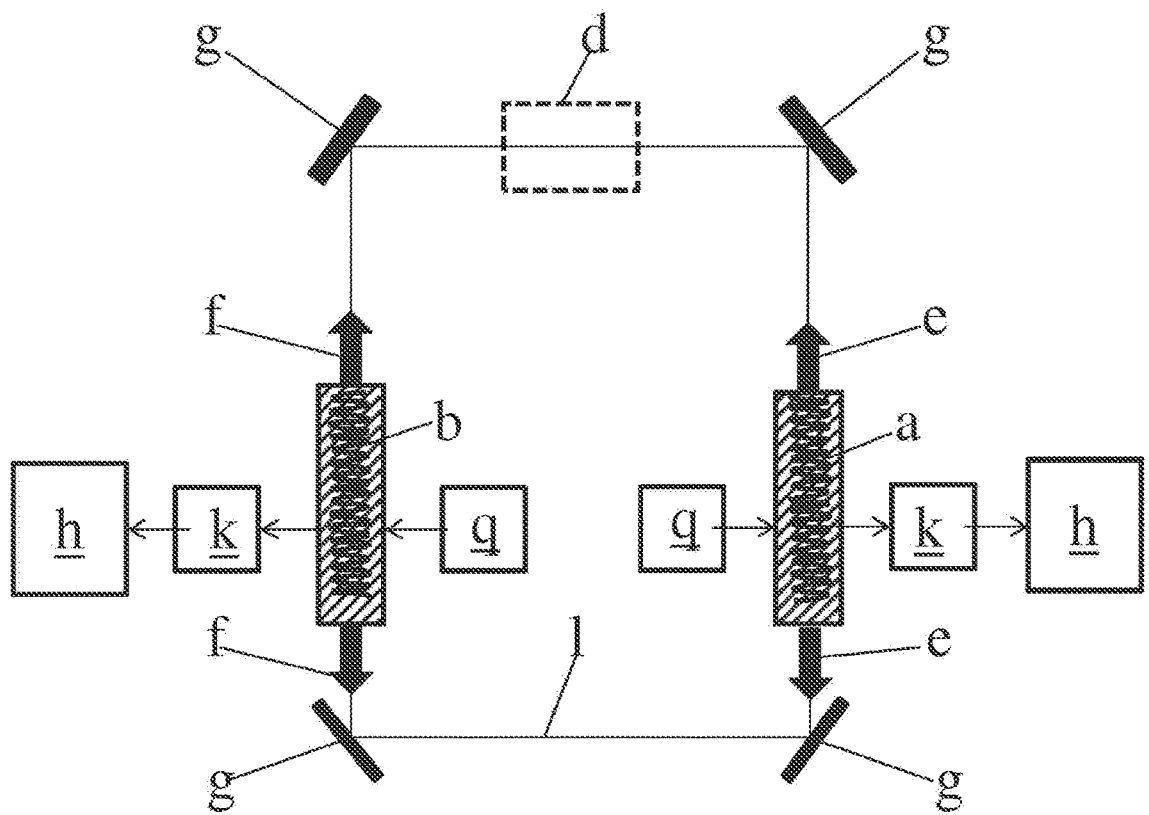
FIGS. 5a to 5c are showing schematic views of adapted setups, each comprising two active cavities, each used as sampling laser and detecting element, showing a back extraction possibility of both cavities, with or without additional reference path and/or isolating elements.
Figure 5B:
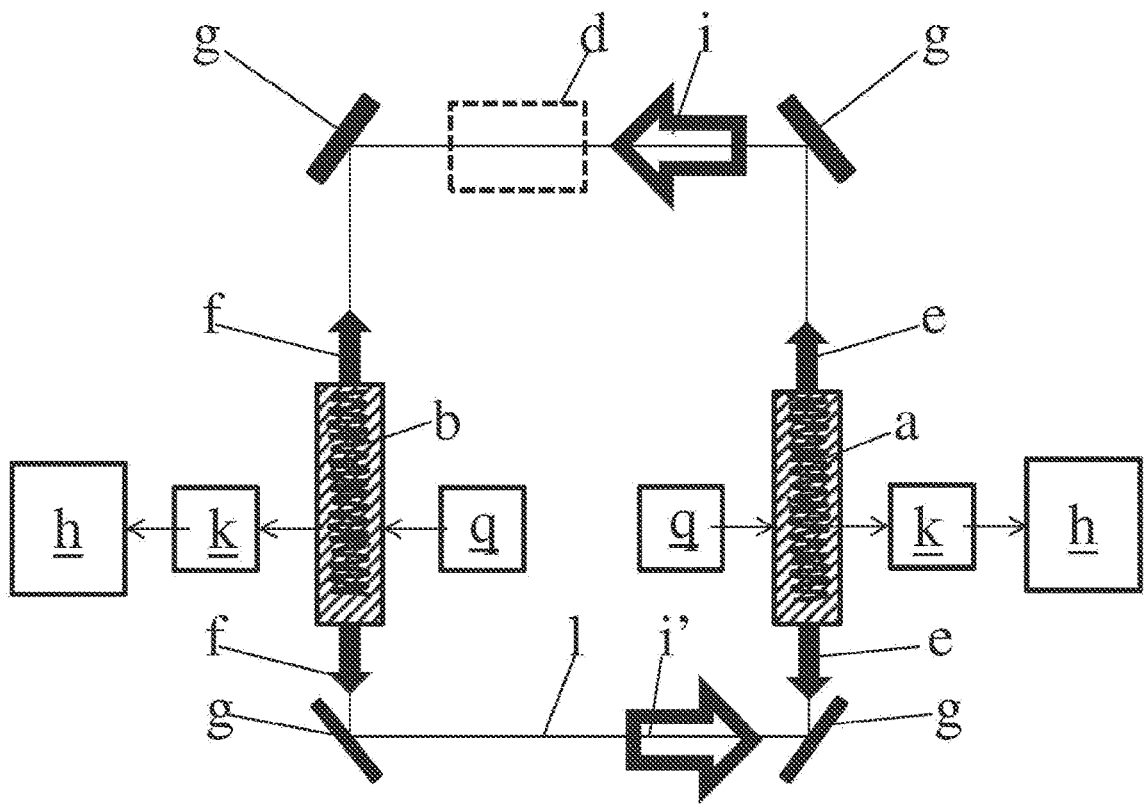
Figure 5C:
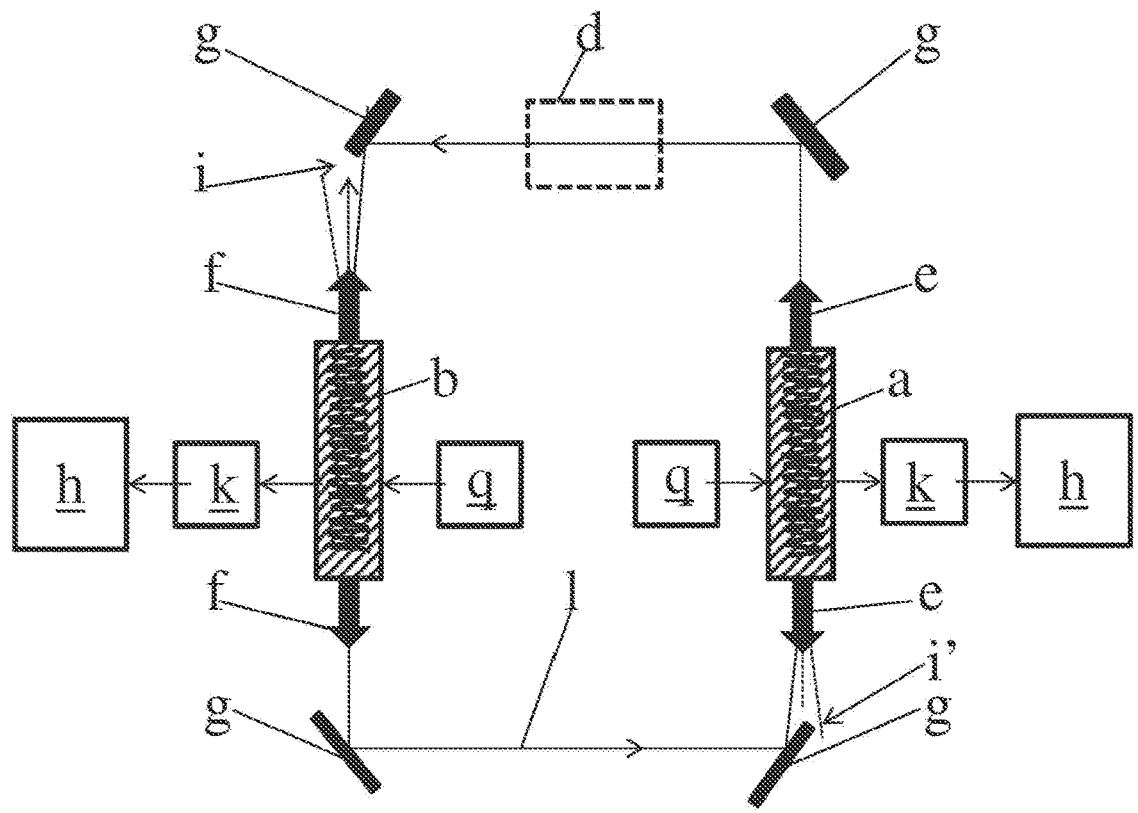

In all embodiments shown in this invention, it is possible to replace the front-extraction only implementation of the first laser light a and second laser light b with a combination of front and back-extraction of the cavities a, b. This is illustrated in FIGS. 5a to 5c. The back-extracted light from laser a and b are used as a reference path l implementation. All the previously described isolating elements i considerations will improve the system stability for the implementation with back extraction in FIG. 5a. Alternatively an optical fiber could be used to form a combining and/or reflecting mean g to reach the reference path l as shown in FIG. 5a, build by at least one optical fiber.

The implementation of isolators I shown in FIG. 5b can be done by all possible isolators i that have been described earlier. Also, an implementation similar with non-normal incident radiation to implement the isolator as shown in FIG. 4c and FIG. 2c can easily be implemented with the same effect.

Another possible implementation is shown in FIG. 5c. The reference path l is implemented through back extraction with isolator implementation using non perpendicular incident radiation.

Figure 6A:
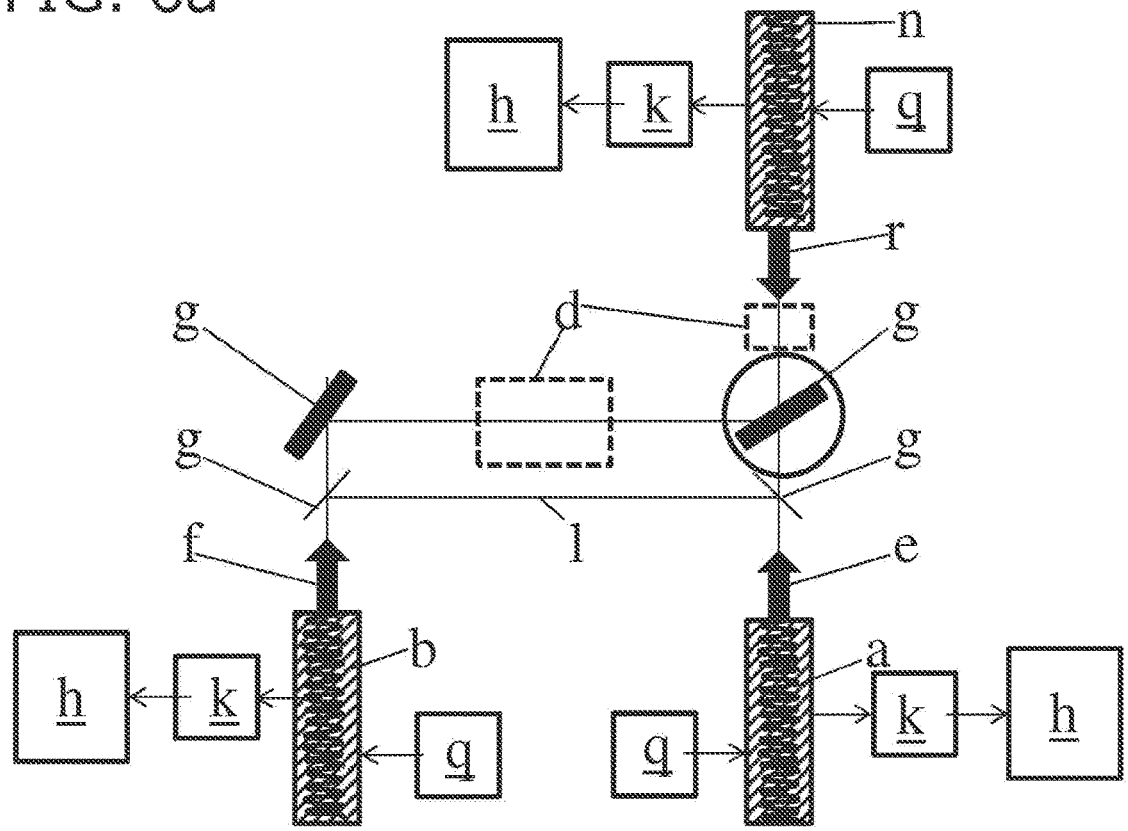
FIGS. 6a to 6c are schematic views of (multi-) heterodyne detection spectrometer setups with three or four cavities used as sampling laser and detecting element.

Again, the embodiment of FIG. 3a can be updated by adding a reference path l to the system as is shown in FIG. 6a. Either laser a or laser b or both laser a and b can then add a heterodyne extraction element k respectively a (multi-) heterodyne signal processing unit h. Isolator elements can be added according to FIG. 4d or implemented in the same way as shown in FIG. 4c.

Figure 6B:
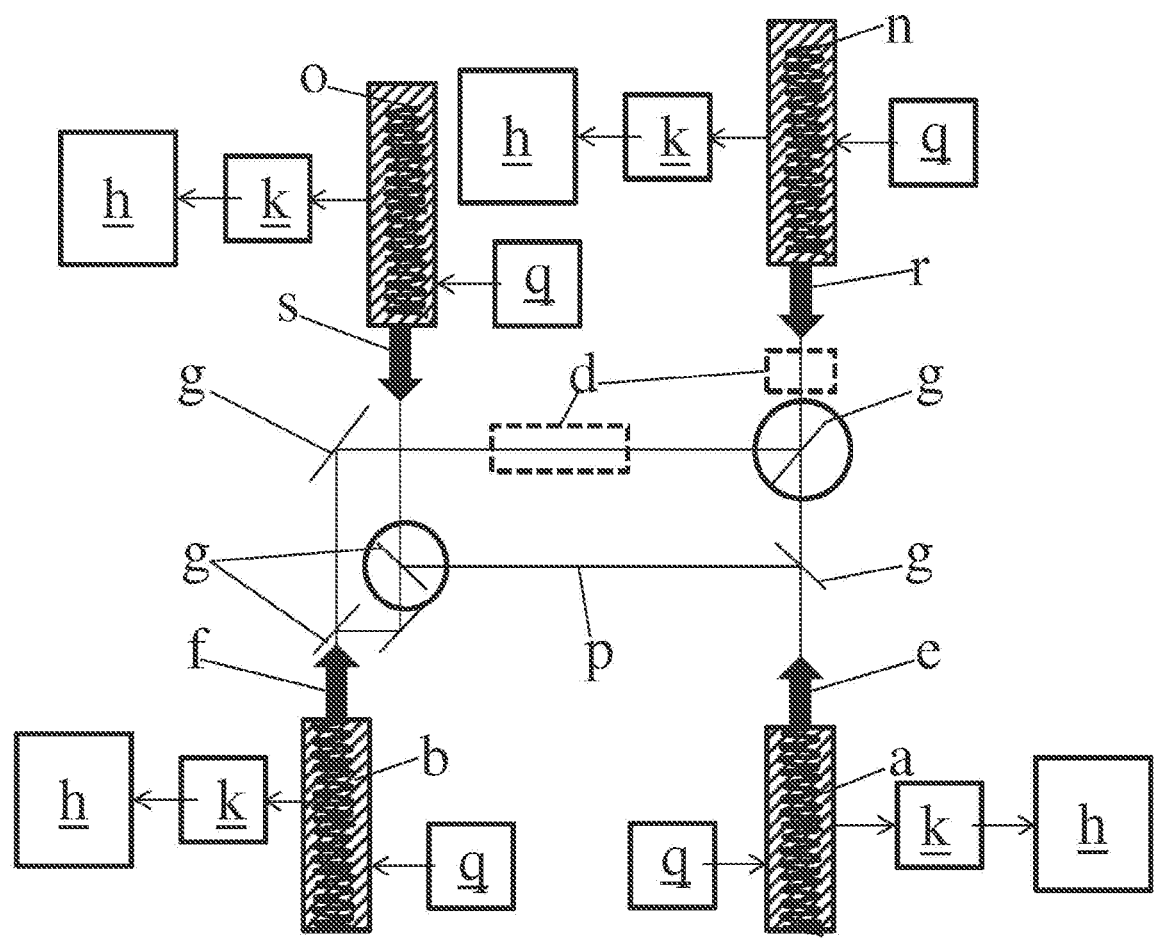

Another preferred embodiment shown in FIG. 6b replaces the reference path of laser l shown in previous embodiments with a different reference path p which is implemented using yet another active cavity enhanced detector o, a fourth active cavity o. The fourth active cavity o is emitting laser beam s by operated with current driver q and simultaneously allows detection of heterodyne signals. With another heterodyne signal extraction element k, heterodyne signals can be extracted from the active medium in the fourth active cavity o, which is further processed by (multi-)heterodyne signal processing unit h. This has the advantage to fully decouple the reference path from the laser a and laser b measurements.

All the isolators i discussed above can be added to the system to increase the system stability.

Figure 6C:
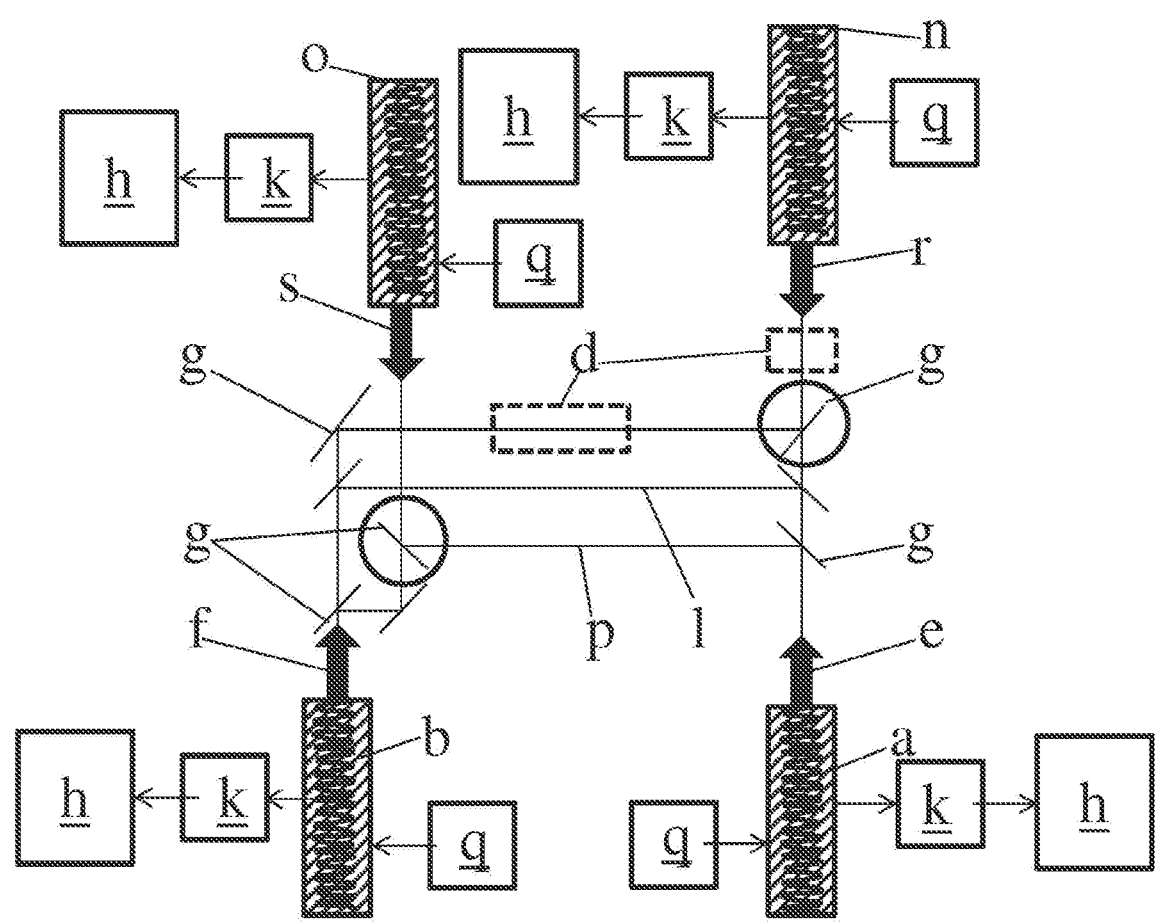

The reference path implementations l as well as p can be combined into a single embodiment illustrated in FIG. 6c. This allows to correlate the measurements of the active detection elements a, b and o to isolate noise sources from the different lasers and therefore get a better signal to noise ratios. A same reference channel l can be implemented between laser n and laser o allowing to further get correlation date between laser o and n to further get better signal to noise ratio data.

All these implementations can be enhanced by placing isolators before laser a and/or laser b and/or laser n and/or laser o to reduce back reflection of optical elements into the active laser element.

Different methods for processing of (multi-)heterodyne signals are known to the person skilled in the art and are not described here in detail.

All active cavities a, b, n, o can be operated below threshold, operated on at least one mode, operated on a plurality of modes respectively the plurality of modes forms an optical frequency comb.

Conventional heterodyne detection spectrometer setups can be modified by extracting the classical detector 5 of the optical path and placing at least one active cavity a, b, n, o instead with necessary current driver q, heterodyne signal extraction element k and (multi-) heterodyne signal processing unit h.

LIST OF REFERENCE NUMERALS 1 first cavity/f1 first laser beam/first frequency
2 second cavity/f2 second laser beam/second frequency
3 beam combiner/combining and deflecting means
4 sample
5 detector
6 heterodyne signal processing unit
a first cavity/laser/active cavity element
b second cavity/laser/active cavity element
d sample
e laser beam 1 from first cavity
f laser beam 2 from second cavity
g combining and/or reflecting means
h (multi-)heterodyne signal processing unit
i optical isolating element/non-normal injection)
k heterodyne signal extraction element (bias-tee or a directional coupler)
l at least one reference path
n third active cavity
o fourth active cavity
p another reference path
q current driver for cavities
r laser beam from third cavity
s laser beam from fourth cavity

The invention claimed is:

1. A heterodyne detection spectrometer setup comprising:
at least a first cavity able to emit a first laser beam,
a second cavity able to emit a second laser beam,
at least one combining and/or reflecting means, wherein the first and second cavities are connected to current drivers for stimulating laser emission,
wherein at least the second cavity is built as an active cavity comprising an active medium connected to a heterodyne signal extraction element and a (multi) heterodyne signal processing unit which is simultaneously usable for laser light generation and as a detector element,
wherein the active medium is introduced in an optical path of the setup so that the first laser beam can enter the second cavity, and
wherein at least one reference path is established between the first and second cavities in the optical path with the at least one combining and/or reflecting means.

2. The heterodyne detection spectrometer setup according to claim 1, wherein the first cavity is built as an active cavity comprising a second active medium connected to a heterodyne signal extraction element and the (multi-)heterodyne signal processing unit, wherein at least one isolator element is placed in the optical path and/or at least one other isolator element is placed in the at least one reference path.

3. The heterodyne detection spectrometer setup according to claim 1, wherein the at least one reference path is established by an implementation of back extraction of the first and second cavities.

4. The heterodyne detection spectrometer setup according to claim 2, wherein the at least one isolator element comprises a faraday rotator with polarizer, a quarter wave plate, an attenuating element or a partial HR coating on a cavity facet.

5. The heterodyne detection spectrometer setup according to claim 2, wherein the at least one isolator element comprises alignments of the first and second cavities in order to prevent the first and second laser beams from entering perpendicular to a laser facet of the other cavity, reaching that reflections from either facet will not be fed back into the originating laser cavity.

6. The heterodyne detection spectrometer setup according to claim 1, wherein the first and second cavities are semiconductor laser, wherein the active cavity is a quantum cascade laser or an interband cascade laser, which is operated either in single mode or as a fabry-perot laser or as a frequency comb laser.

7. A heterodyne detection method, using the heterodyne detection setup according to claim 1, the method comprising:
emitting the first laser beam from the first cavity,
emitting the second laser beam from the second cavity through the optical path by passing the combining and/or reflecting means,
wherein one portion of at least one of the first and second laser beams passes a sample running through the optical path and one portion of at least one of the first and second laser beam passes a reference path,
wherein laser radiation is mixed together in the active medium of the respective other cavity in which laser radiation is also stimulated and the mixed laser radiation in the first and second cavity is extracted by the heterodyne signal extraction element and processed by the (multi-)heterodyne signal processing unit simultaneously, while laser radiation is stimulated in the first and the second cavity.

8. A heterodyne detection spectrometer setup comprising:
at least a first cavity able to emit a first laser beam,
a second cavity able to emit a second laser beam,
at least one combining and/or reflecting means, where the first and second cavities are connected to current drivers for stimulating laser emission,
wherein a third cavity, representing an active cavity simultaneously usable for laser light generation and as a detector element, comprising an active medium is introduced in an optical path of the setup so that at least one of the first laser beam and the second laser beam is arranged to enter the third cavity, wherein the third cavity is connected to a current driver in order to stimulate laser radiation in the active medium of the third cavity and the third cavity additionally is connected to a heterodyne signal extraction element and a (multi-)heterodyne signal processing unit, for simultaneous extraction and therewith detection of heterodyne signals from the active medium of the third cavity, while laser light is stimulated in the third cavity and in the first cavity and/or second cavity and merged in the third cavity.

9. The heterodyne detection spectrometer setup according to claim 8, wherein at least one of the first cavity and the second cavity is another active cavity, used as a laser light source and detector element simultaneously, by each being connected to a heterodyne signal extraction element and a (multi-)heterodyne signal processing unit.

10. The heterodyne detection spectrometer setup according to claim 8, wherein a fourth cavity is placed in the optical path, connected to a current driver for stimulating laser emission and connected to a heterodyne signal extraction element and a (multi-)heterodyne signal processing unit, for simultaneous generation of laser radiation and extraction/detection of heterodyne signals from an active medium of the fourth active cavity.

11. The heterodyne detection spectrometer setup according to claim 8, wherein at least one reference path is established between at least two of the cavities in the optical path.

12. The heterodyne detection spectrometer setup according to claim 11, wherein the at least one reference path is established by a multiplicity of combining and deflecting means and/or implementation of back extraction of the cavities.

13. The heterodyne detection spectrometer setup according to claim 11, wherein at least one isolator element is placed in the optical path and/or the at least one reference path.

14. The heterodyne detection spectrometer setup according to claim 13, wherein the at least one isolator element comprises a faraday rotator with polarizer, a quarter wave plate, an attenuating element or a partial HR coating on the cavity facet.

15. The heterodyne detection spectrometer setup according to claim 13, wherein the at least one isolator element comprises alignments of the cavities in order to prevent laser beams from entering perpendicular to a laser facet of the other cavities, reaching that reflections from either facet will not be fed back into the originating laser cavity, while at least two cavities are emitting and detecting simultaneously.

16. The heterodyne detection spectrometer setup according to claim 8, wherein the cavities are semiconductor laser, wherein the active cavity is a quantum cascade laser or an interband cascade laser, which is operated either in single mode or as a fabry-perot laser or as a frequency comb laser.

17. A heterodyne detection method, using the heterodyne detection setup according to claim 8, the method comprising:

emitting the first laser beam from the first cavity, emitting the second laser beam from the second cavity through the optical path by passing the at least one combining and/or reflecting means, wherein at least one of the first and second laser beams passes a sample, wherein laser radiation is mixed together in the active medium of the third cavity in which laser radiation is also stimulated and the mixed laser radiation in the third cavity is extracted by the heterodyne signal extraction element and processed by the (multi-)heterodyne signal processing unit simultaneously while laser radiation is stimulated in the third cavity.

18. The heterodyne detection method according to claim 17, wherein at least one of the first cavity and the second cavity is connected to the heterodyne signal extraction element and the (multi-) heterodyne signal processing unit and is operated as active cavity in which laser radiation is mixed before heterodyne signal extraction and processing simultaneously while laser radiation is stimulated in the active medium of the cavities.

19. The heterodyne detection method according to claim 17, wherein a fourth cavity with an active medium in which laser radiation is stimulated is operated with a current driver, the heterodyne signal extraction element and the (multi-) heterodyne signal processing unit, for generating and detecting laser radiation simultaneously in the fourth cavity.

20. The heterodyne detection method according to claim 17, wherein at least one of the laser beams passes at least one reference path to reach reference signals in the third cavity.

21. The heterodyne detection method according to claim 20, wherein at least two cavities use additional back extraction of the radiation for implementation of the at least one reference path.

22. The heterodyne detection method according to claim 17, wherein at least one of the laser beams passes an optical isolating element along the optical path.

23. The heterodyne detection method according to claim 17, wherein the at least one signal of the cavities is used to down mix the signals to low frequency bands by mixing the signals of third active cavity with first cavity and third cavity with second cavity and mixing those, respectively mixing signals of fourth cavity with one of the first to third cavities.

24. The heterodyne detection method according to claim 17, wherein the third cavity is either driven below the threshold current, above the threshold current or in reverse bias.

25. The heterodyne detection method according to claim 17, wherein the at least one active cavity is operated below threshold, operated on at least one mode, operated on a plurality of modes, in particular if the plurality of modes forms an optical frequency comb.

* * * * *